Jan. 11, 1949.  A. W. McDONALD  2,458,618
FOLDABLE STEP FOR TRAILERS
Filed July 1, 1946
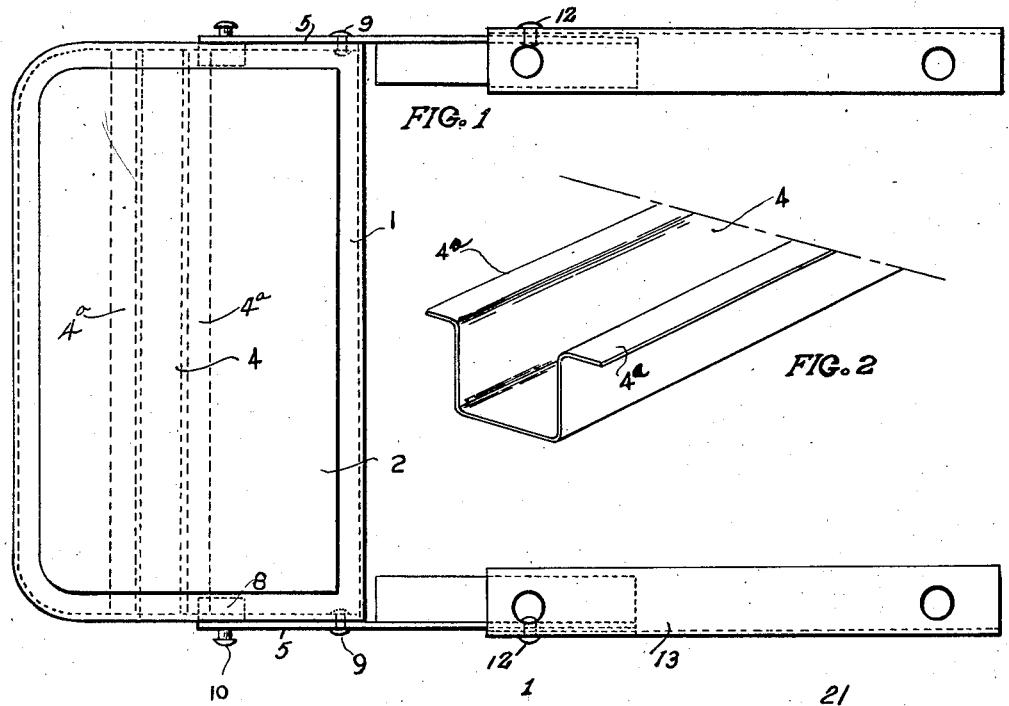
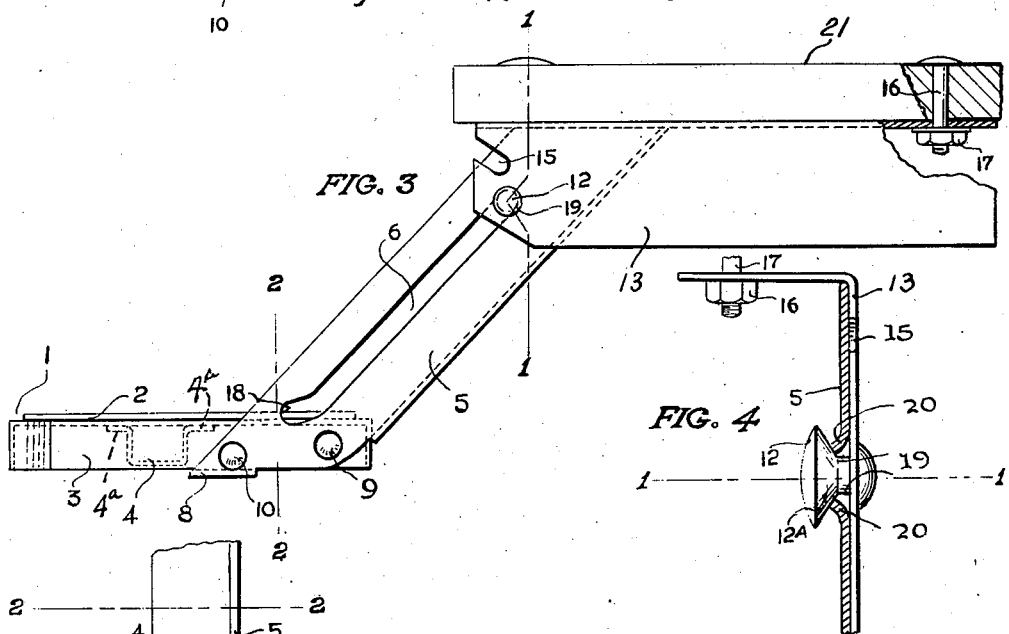
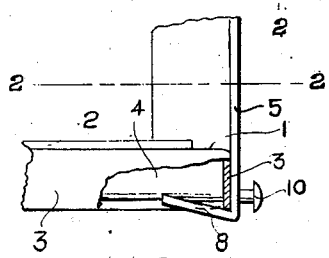
Albert W McDonald, INVENTOR.
BY
Lester L Sargent  ATTORNEY Patented Jan. 11, 1949

2,458,618

UNITED STATES PATENT OFFICE 2,458,618

FOLDABLE STEP FOR TRAILERS

Albert W. McDonald, Elkhart, Ind.

Application July 1, 1946, Serial No. 680,676

4 Claims. (Cl. 280—166)

The object of my invention is to provide a novel and improved foldable step for attachment to trailers which may be quickly and easily collapsed and folded under the trailer when not in use. It is also an object of my invention to provide novel means for bracing and supporting the step when it is in an extended position and for preventing the step from becoming wedged or hung, which has been the difficulty of trailer steps of the prior art.

It is a special object of my invention to make certain improvements on the step disclosed in my Patent No. 2,209,576, patented July 30, 1940, and to provide a novel reinforcing element for preventing the side arms of the step from bowing from the tread under weight.

I attain the objects of my invention by the mechanism illustrated in the accompanying drawings in which—

Figure 1 is a top plan view of my improved step;

Fig. 2 is a perspective view of the reinforcing element;

Fig. 3 is a side elevation of my improved step;

Fig. 4 is a detail view of a portion of one of the side arms; and

Fig. 5 is a detail view of one of the side arms, showing the novel construction of the side arm and flange.

Like characters of reference designate like parts in each of the views.

Referring to the drawings, I provide a metal tread 1 carrying a flexible mat 2. The tread was downturned flanges 3 extending all the way around the tread. This tread is reinforced by a novel U-shaped channel-iron 4 which is provided with outurned opposite flanges 4a. These flanges are welded to the underside of the tread, as shown in dotted lines in Figs. 1 and 3. The tread itself is pivotally attached by its downturned flanges and by the pivots 9 to the side arms 5, each of which has a longitudinal slot 6 through which passes the rivet 12, secured to L-shaped bracket 13, which is fastened to the chassis 21 of the vehicle by the bolt 16 and nut 17.

Slot 6 has an offset extension 18 at its lower end. The member 5 adjacent the upper end of slot 6 is bent inwardly to engage the beveled under-surface 12a of the rivet 12. The advantage of this construction is that the side arms 5 slide loosely on the rivets 12 until the step is moved to its lowered position, when the side arms at their inwardly bent portions 20 at the upper ends of slots 6 engage the beveled under-surface 12a of the pivots 12 to securely hold and lock the side arms 5 in their lower and extended positions. This construction is advantageous over what is disclosed in my Patent 2,209,576, in that there is a locking engagement between the bent portions 20 of side arms 5, as shown in Fig. 4, and the novel beveled surface 12a of the rivets 12, while throughout the main portion of the slots 6, the side arms slide freely, making it easy to fold the step and slide it into or out of place under the trailer body.

I have also improved on the inwardly turned flanges 8 by bending them at an acute angle to the side arms 5, of which they are an extension, as shown in Fig. 5, whereby they have a locking engagement with the downturned flanges 3 of the metal tread 1 locking the tread 1 firmly in place when it is swung to its horizontal position for use. About a 20° bevel is provided on the underside 12a of the conical beveled rivet 12.

I provide an improved reinforcing member 4, as shown in Figs. 2, 3 and 5, for the underside of the tread consisting of a U-shaped reinforcing strip extending longitudinally on the under side of the tread and having outturned flanges 4a, which are welded to the underside of the step. This construction takes the sway out of the tread or step and holds its rigid. It also reinforces a greater area than the form of reinforcement shown in my Patent 2,209,576.

In the depending brackets 13, on which the side arms 5 are slidably mounted, I provide upwardly slanting slots 15 extending to the outer edge of the bracket, to receive the projecting rivet 10 carried by arms 5, when the step is folded and slid into its concealed position under the body of the trailer, in the manner shown in my prior Patent 2,209,576.

In operation, when the step is pulled out and down to a usable position from its normally concealed position under the body of the trailer, the flanges 8 snugly engage the downturned flanges 3 of the tread in order to hold the step in a secure and non-swaying position and to eliminate the unnecessary looseness which has been a fault of prior steps. The offset portion 20 of the side arms 5 and the beveled under-surface 12a of the rivets 12 snugly engage each other and prevent catching or sticking of the rivet on the rough longitudinal edges of the slot 6 as the side arms slide loosely on the rivet until they reach the offset extension 19 and the portion 20 of the side arms 5.

Also the slight acute angle of the flange 8 makes an important difference in the operation of the step as this flange 8 will engage the downturned flange 3 depending from the edge of the tread 1 to hold the tread-piece in place without any side movement. The acute angular position of the flanges 8 prevents the side arms from bowing away from the tread or from bending under the tread where weight is applied to the tread.

What I claim is:

1. In a foldable step for trailers, a pair of spaced depending brackets secured to the under side of the body of the trailer, inwardly projecting rivets on said depending brackets, said rivets having their heads beveled on their inner surfaces; side arms having longitudinal slots through which each of said rivets project, said slots having offset extensions at their lower ends, the portions of the side arms adjacent to the upper ends of the slots being bent to snugly engage the inner beveled surfaces of the rivets when the side arms are moved to their unfolded position for use, whereby to firmly hold them in this position to prevent swaying, a foldable step pivotally mounted on the lower ends of said side arms, and means for holding said steps in horizontal position for use.

2. In combination with the mechanism defined in claim 1, the side arms having flanges at their lower ends bent upwardly at an acute angle, whereby to hold the step against any swaying movement.

3. In a foldable step for trailers, a pair of spaced depending brackets secured to the under side of the body of the trailer, rivets on said depending brackets, said rivets having their inner surface beveled, side arms having longitudinal slots through which said rivets project, said slots having offset extensions at their lower ends, the portion of the side arms adjacent the upper ends of the slots being inwardly bent to frictionally engage the conical inner surface of the rivets but holding the side arms secure when unfolded for use, said arms being slidable relative to the brackets, and a tread pivotally mounted on the lower ends of said side arms and having downturned flanges, the side arms having flanges inturned at an acute angle at their lower ends and engaging under the adjacent flanges of the tread to hold the tread in a firm horizontal position when extended for use.

4. A foldable step for trailers as set forth in claim 1, characterized by the step having a rigid upper wall and a U-shaped reinforcing member having outwardly turned horizontal flanges at its upper side edges anchored to the under side of the upper wall of the step to reinforce the tread surface of the step.

ALBERT W. McDONALD.

REFERENCES CITED

The following references are of record in the file of this patent:

UNITED STATES PATENTS

| Number | Name | Date |
|---|---|---|
| 1,148,356 | Chickering | July 27, 1915 |
| 1,461,906 | Hughes | July 17, 1923 |
| 2,209,576 | McDonald | July 30, 1940 |
| 2,230,635 | Alderfer | Feb. 4, 1941 |